July 12, 1932.  A. T. LIGHT  1,866,988
REFRIGERATION
Filed Oct. 25, 1927   4 Sheets-Sheet 2

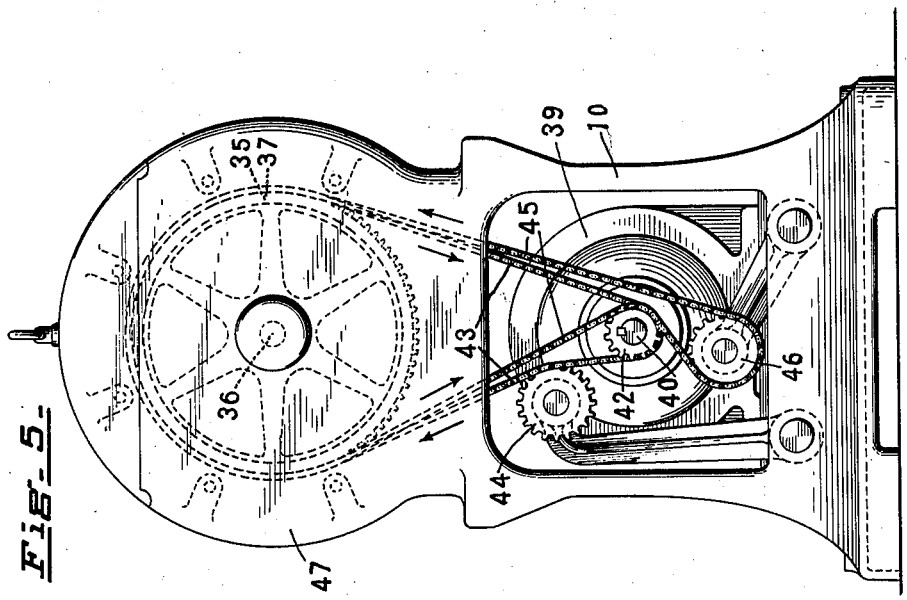
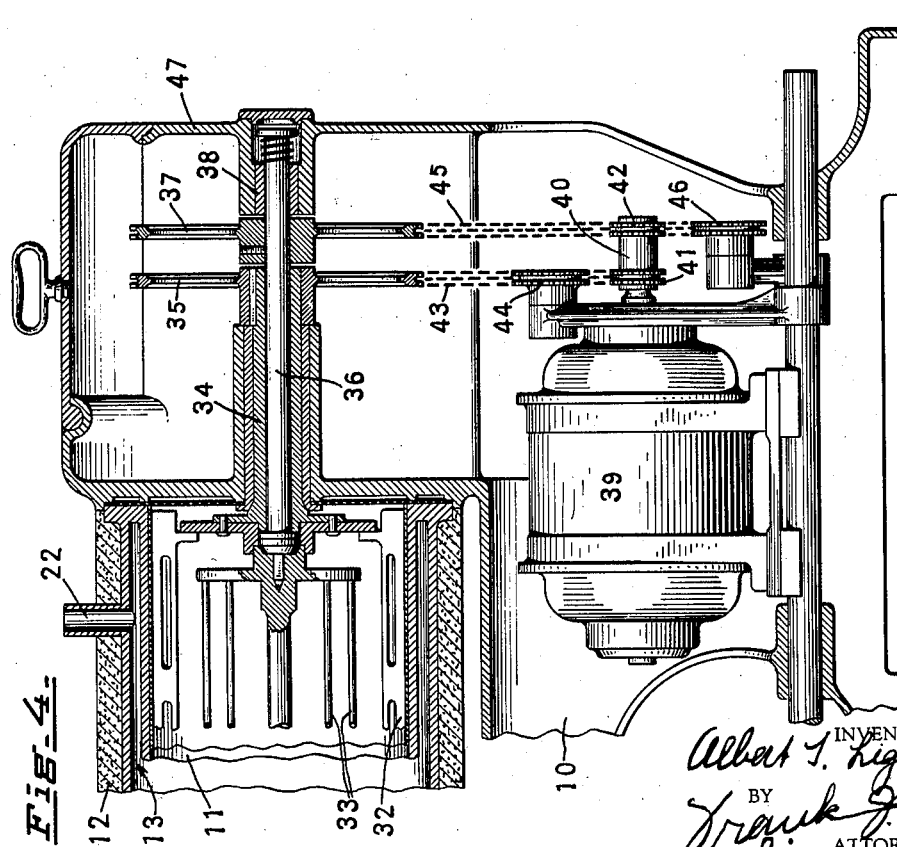

July 12, 1932. A. T. LIGHT 1,866,988
REFRIGERATION
Filed Oct. 25, 1927 4 Sheets-Sheet 4

Albert T. Light, INVENTOR
BY Frank Kent
his ATTORNEY

Patented July 12, 1932

1,866,988

UNITED STATES PATENT OFFICE

ALBERT T. LIGHT, OF BROOKLYN, NEW YORK, ASSIGNOR TO YORK ICE MACHINERY CORPORATION, OF YORK, PENNSYLVANIA

REFRIGERATION

REISSUED

Application filed October 25, 1927. Serial No. 228,529.

This invention relates to refrigeration, and particularly to means for putting an evaporator quickly into and out of operation at will. The invention has particular utility in the freezing of ice cream, and for purpose of illustration will be described as so applied.

The invention aims to provide a means for freezing the ice cream expeditiously by bringing the liquid refrigerant into direct contact with the freezing cylinder, and to cause a rapid change in freezing conditions at the end of the freezing period by immediately removing the liquid refrigerant from contact with the freezing cylinder, thereby facilitating the whipping process.

The device includes a low pressure receiver into which the liquid refrigerant is delivered from the condenser, suitable mechanism such as a pump for circulating the refrigerant about the freezing cylinder and draining means for quickly removing the refrigerant from contact with the freezing cylinder when desired, and returning it to the receiver.

While preferred embodiments of the invention are herein disclosed for purposes of illustration, it should be understood that various changes may be made in the structure without departing from the spirit and scope of the invention as hereinafter set forth and claimed.

In the drawings:

Fig. 4 is an elevation partly in section of the driving mechanism.

Fig. 5 is a rear elevation of the driving mechanism.

Figure 1:
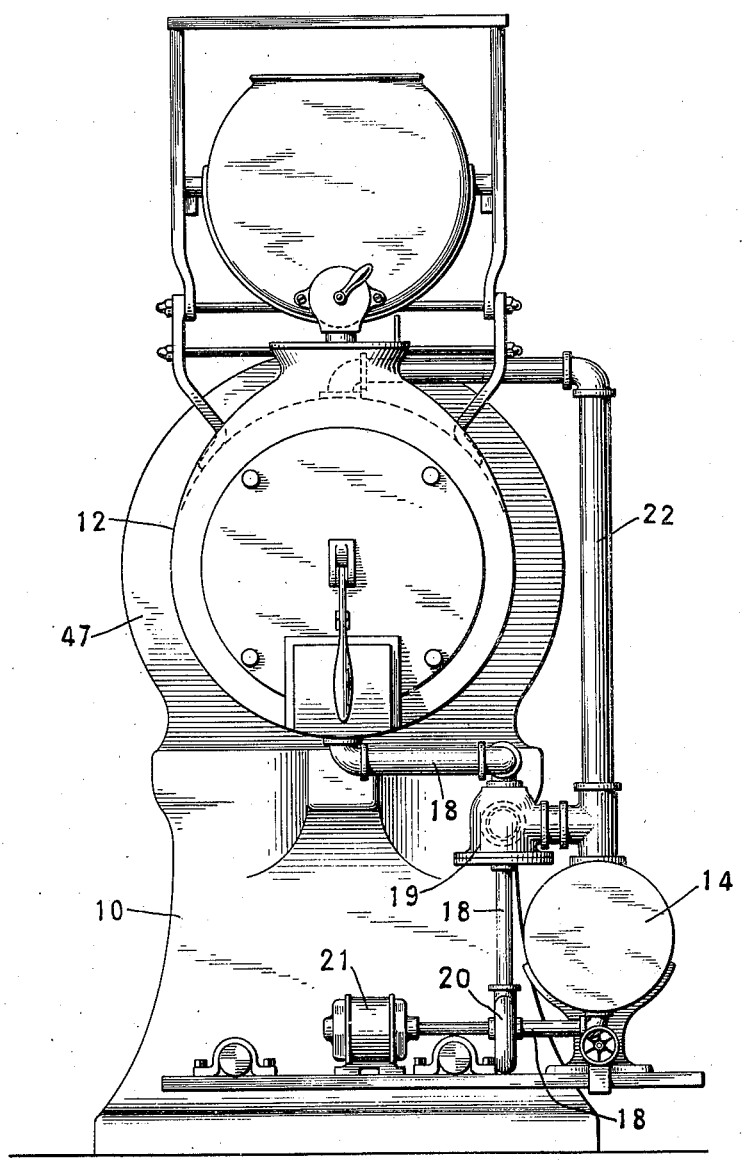
Fig. 1 is a front elevation of a freezer constructed according to this invention.

Referring to the drawings more particularly, the machine includes a base 10, upon which are supported the various parts of the freezer. The freezing cylinder 11 (Fig. 4) is surrounded by the insulated casing 12, and the jacket space 13 lying between the cylinder 11 and the casing 12 constitutes the evaporator.

In carrying out the objects of the invention any preferred volatile liquid refrigerant is brought into contact with the exterior of the freezing cylinder 11 during the period during which the ice cream is being frozen in the cylinder. After the ice cream has reached a certain consistency it is desirable to prevent any further lowering of the temperature of the ice cream, and then to continue to whip it with the beating elements until it has attained the proper swell or overrun. During this whipping period the temperature should not drop, but should remain practically stationary or should rise slightly. In order to attain this end the invention provides for removing the liquid refrigerant from contact with the freezing cylinder during the whipping period.

Figure 2:
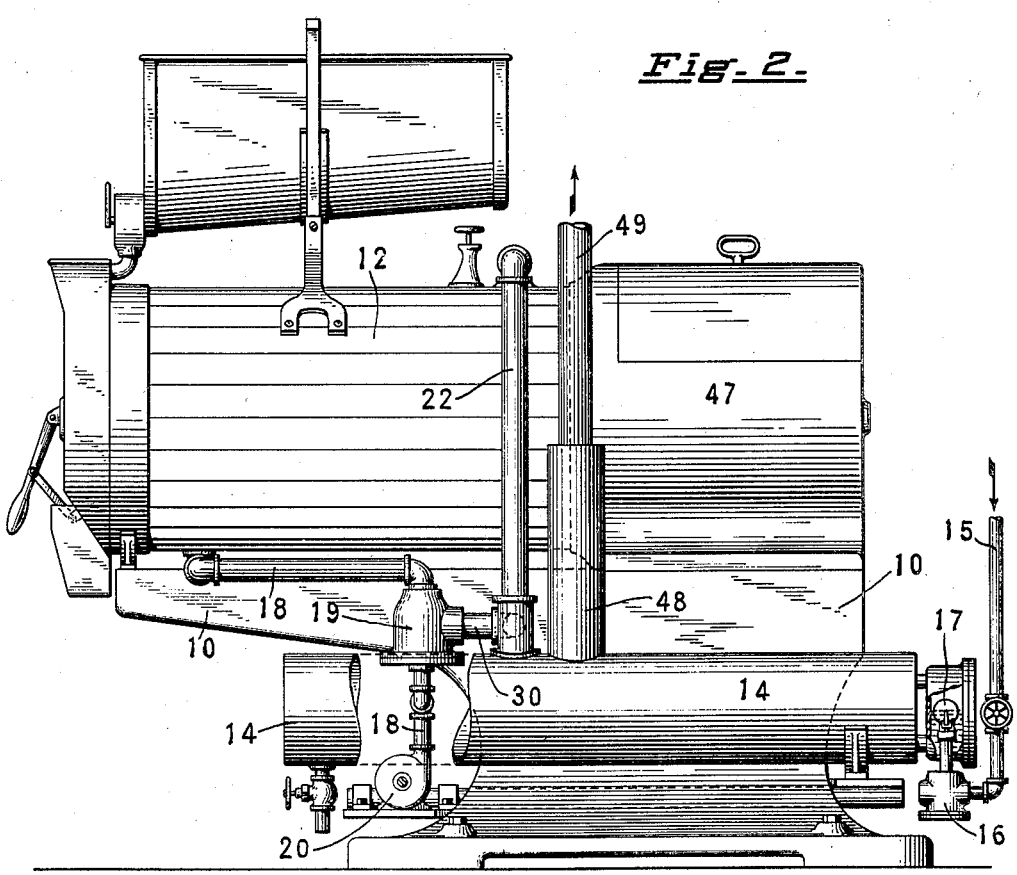
Fig. 2 is a side elevation of the machine of Fig. 1.

One arrangement for handling the liquid refrigerant is illustrated in Figs. 1 and 2. This mechanism includes a tank or low pressure receiver 14 carried by the base 10 below the casing 12. A high pressure liquid refrigerant supply line 15 carries the liquid refrigerant from any suitable compressor and condenser, not shown, through strainer 16 and float valve 17 to the receiver 14. The float valve is arranged to shut off the incoming supply whenever the liquid in receiver 14 reaches a certain level. A supply line 18 leads from the bottom of the receiver 14 through a control valve 19 to the lower part of the evaporator 13. A pump 20, operated by a motor 21, is interposed in the supply line 18 for pumping the liquid through line 18 and control valve 19 to the evaporator. A return line 22 runs from the top of the evaporator 13 back to the receiver 14, thus completing a closed circuit which includes the evaporator and the receiver.

Figure 3:
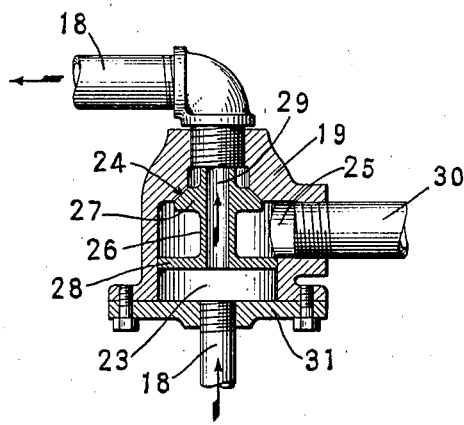
Fig. 3 is an enlarged section of part of the mechanism.

The control valve 19 is shown in detail in Fig. 3 and includes a casing provided with a chamber 23 having a conical seat 24 at its upper end and a port 25 leading through one side. The moving element comprises a barrel member 26 which carries near one end a conical valve head 27 which fits into the seat 24, and at its other end a disc 28 which fits closely in the chamber 23. A passage 29 leads through the center of the barrel 26. A drain connection 30 leads from port 25 to the return line 22. The supply line 18 leads into the bottom of the chamber 23 through the cover plate 31.

The stirring elements within the freezing cylinder comprise a scraper 32 which moves in one direction next to the inner wall of cylinder 11, and an inner beater 33 which moves in the opposite direction. These elements are operated by mechanism now to be described.

The scraper 32 carries at its rear end a hollow shaft 34 which projects through one end of cylinder 11 and has a sprocket 35 keyed thereto. A shaft 36, connected with the beater, extends through the shaft 34 and has a sprocket 37 keyed thereon, the outer end of shaft 36 being supported in a bearing 38 mounted on base 10. A motor 39, in the lower part of base 10, has its shaft 40 provided with drive sprockets 41 and 42 alined with sprockets 35 and 37 respectively. A sprocket chain 43 extends around the sprockets 41 and 35 and is tightened by the idler 44. A second sprocket chain 45 has its upper end passed around the sprocket 37 and its lower end passed around an idler 46 located below the sprocket 42, one side of chain 45 being partly wrapped around the driving sprocket 42 as will be clear from Fig. 5. Because of this arrangement, when the shaft 40 rotates in a clockwise direction, the sprocket 35 will rotate in the same direction, while the sprocket 37 will rotate in a counter clockwise direction, and the beater and scraper will therefore be rotated in opposite directions. This mechanism provides a simple and direct drive and eliminates the large friction losses incident to the use of bevel gears, and other types of gear devices. A casing 47 encloses the sprocket 35 and 37.

The machine operates in the following manner:

After the batch of cream has been placed in the cylinder 11 the motor 39 is started, thereby putting the stirring elements into operation. At the same time the motor 21 which drives pump 20 is set into operation. This pump draws the liquid refrigerant from the bottom of the receiver 14 and discharges it into the chamber 23. The pressure created below the disc 28 pushes the member 26 to its upper position illustrated in Fig. 3, shutting off passage through pipe 30 but permitting the liquid to flow through passage 29 and thence via line 18 to the evaporator 13. When the evaporator becomes filled, liquid and vapor will pass through overflow line 22 back to receiver 14, and the pump 20 will keep circulating the refrigerant through the evaporator in direct contact with the entire outer surface of cylinder 11, thereby bringing about a very rapid and uniform cooling of the batch in the cylinder 11.

A gas and liquid separator 48 is in communication with the upper part of receiver 14, and the suction line 49 of the compressor (not shown) leads from the separator to carry off the evaporated refrigerant.

When the batch has been frozen to the desired consistency and it is desired to whip the frozen cream, the motor 21 is stopped. This action stops the upward pressure against member 26 and permits it to fall to the bottom of chamber 23, in which position it allows the refrigerant to drain from the evaporator 13 back to receiver 14 by way of the return line 30. In this way the chamber 13 is quickly drained of liquid refrigerant, and no further lowering of the temperature of the charge can then take place. Meanwhile the motor 39 continues to run and the whippers beat up the frozen cream for a period long enough to give the desired overrun.

The tank 14 acts as a low pressure container in which the liquid refrigerant is kept under practically no pressure, and since it always contains a bevel of refrigerant, the machine is always ready to start freezing a fresh batch of cream as soon as it is placed in the cylinder 11.

In this manner the liquid refrigerant is used over and over by being circulated between the low pressure container 14 and the refrigeration chamber 13, and only such refrigerant as vaporizes is carried off to the compressor. The float valve insures a certain level of liquid refrigerant in the container at all times, but there is always enough free space in the container 14 to permit all of the liquid in the refrigeration chamber 13 to flow back into the container.

It will be observed that the arrangement above described functions to maintain the evaporator flooded when the pump is in operation and to drain it rapidly when the pump stops.

It will be evident that any suitable arrangement could be used to circulate the refrigerant between the low pressure receiver and the evaporator, the essential requirements for ice cream freezing being that the liquid be brought into direct contact with the freezing cylinder during the freezing period and be quickly withdrawn at the end of said period.

Figure 6:
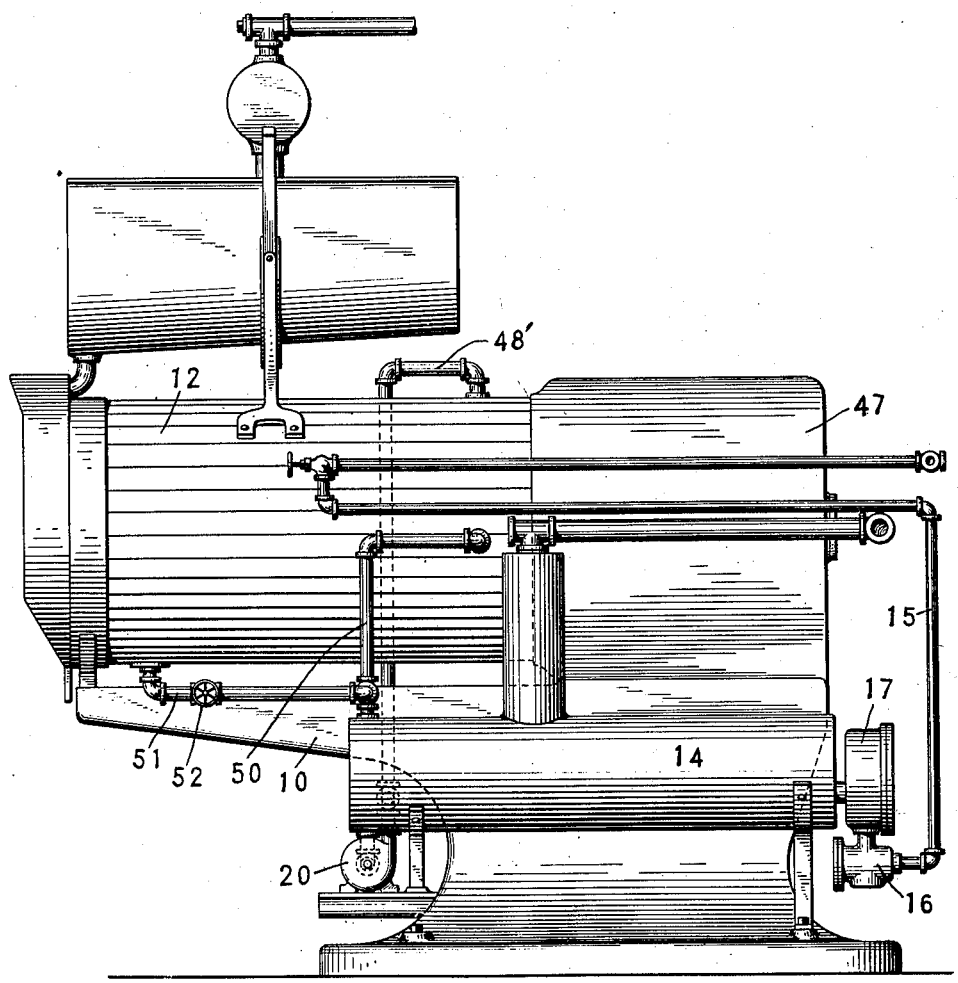
Fig. 6 is a side elevation of another embodiment of the invention.
Figure 7:
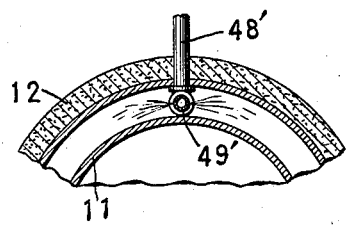
Fig. 7 is a sectional detail.

Another arrangement for carrying out the process is shown in Fig. 6. In this case the liquid refrigerant is pumped from the low pressure receiver 14 through line 48' to the header 49' located in the evaporator above the cylinder 11. The header is arranged to spray the liquid over the sides of the cylinder 11 for its entire length. The liquid is permitted to collect in the refrigerant chamber until it reaches the height of the overflow pipe 50 which conducts it back to the low pressure receiver. A drain line 51, controlled by a manually operable valve 52, leads from the bottom of the evaporator to the low pressure receiver 14. During the freezing period the valve 52 is closed but when it is desired to begin whipping, the pump is stopped and valve 52 is opened, thereby quickly draining the liquid from the evaporator.

In the modified construction above described the evaporator is partially flooded. The location of the overflow pipe 50 determines the depth to which it is flooded, and this may be arranged to suit particular conditions.

An important feature of the invention is the ability to withdraw the volatile liquid refrigerant from the evaporator quickly and certainly. Another important point is that the evaporator is flooded. Because of the simplicity of the structure the use of a circulating pump and gravity return flow to accomplish the result just stated is preferred. The use of the by-passing return flow valve which allows the backward flow from the evaporator to occur around the pump, is important, not only because it allows displacement types of pump to be used, but also because it gives a relatively rapid return flow. However, there are various ways in which the desired result can be secured, and except as specified in the claims, no necessary limitation to the particular structure here illustrated is implied.

While the invention has its primary utility in the ice cream field, it is available for use in any field where a rapid suspension and a resumption of the evaporator action is desirable.

In certain of the claims the word "cylinder" is used to describe the chamber in which the batch to be frozen is contained during the freezing operation. This is used in the sense in which it is used in the ice cream industry without any implication of limitation to a true or approximately cylindrical form of the chamber.

I claim:

1. An ice cream machine comprising a freezing cylinder, a refrigeration chamber associated with the cylinder, means for supplying liquid refrigerant to the refrigeration chamber in direct contact with the cylinder during the freezing period, and means comprising a portion of said first named means for discharging the liquid refrigerant from the refrigeration chamber to expedite the whipping operation.

2. An ice cream machine comprising a freezing cylinder, a refrigeration chamber associated with the cylinder, a low pressure container, means for supplying liquid refrigerant to the low pressure container, means for removing liquid refrigerant from the low pressure container and supplying it to the refrigeration chamber in direct contact with the cylinder during the freezing period, and means comprising a portion of said first named means for discharging the liquid refrigerant from the refrigeration chamber (and returning it to the low pressure container) to expedite the whipping operation.

3. An ice cream machine comprising a freezing cylinder, a refrigeration chamber associated with the cylinder, a low pressure container, a feed line adapted to carry liquid refrigerant to the low pressure container, an exhaust line adapted to carry vaporized refrigerant away from the low pressure container, means for removing liquid refrigerant from the low pressure container and supplying it to the refrigeration chamber in direct contact with the cylinder during the freezing period, and means comprising a portion of said first named means for discharging the liquid refrigerant from the refrigeration chamber (and returning it to the low pressure container) to expedite the whipping operation.

4. An ice cream machine comprising a freezing cylinder, a refrigeration chamber associated with the cylinder, a low pressure container, a feed line adapted to carry liquid refrigerant to the low pressure container, a float valve in the feed line, an exhaust line adapted to carry vaporized refrigerant from the low pressure container, means for removing liquid refrigerant from the low pressure container and supplying it to the refrigeration chamber in direct contact with the cylinder during the freezing period, and means comprising a portion of said first named means for discharging the liquid refrigerant from the refrigeration chamber (and returning it to the low pressure container) to expedite the whipping operation.

5. An ice cream machine comprising a freezing cylinder, a refrigeration chamber associated with the cylinder, a low pressure container adapted to receive liquid refrigerant, a feed line adapted to carry liquid refrigerant from the low pressure container to the refrigeration chamber, a pump in the feed line, and a line comprising a portion of said feed line for returning the liquid refrigerant from said refrigeration chamber to the low pressure container.

6. An ice cream machine comprising a freezing cylinder, a refrigeration chamber associated with the cylinder, a low pressure container, a feed line adapted to carry liquid refrigerant to the low pressure container, a float valve in the feed line, an exhaust line adapted to carry vaporized refrigerant from the low pressure container, a pump line adapted to carry liquid refrigerant from the low pressure container to the refrigeration chamber, a pump in the pump line, and a return line comprising a portion of said pump line for carrying the liquid refrigerant back to the low pressure container.

7. An ice cream machine comprising a freezing cylinder, a refrigeration chamber associated with the cylinder, a low pressure container adapted to receive liquid refrigerant, a feed line adapted to carry liquid refrigerant from the low pressure container to the bottom of the refrigeration chamber, a return line for the refrigerant, a pressure operated valve controlling a passage to the return line, a pump in the feed line between the valve and the low pressure container, and an overflow line extending from the top of the refrigeration chamber to the low pressure container.

8. The combination of an ice cream freezer having an evaporator directly associated therewith; means for supplying volatile liquid refrigerant to the evaporator; and means including a portion of the first named means for discharging liquid refrigerant from the evaporator.

9. The combination of an ice cream freezer having an evaporator in heat exchanging relation therewith; a low pressure receiver for volatile liquid refrigerant substantially devoid of heat exchanging relation with said freezer; means affording a closed circuit for refrigerant from the receiver upward through said evaporator and back to the receiver; and means operable at will for discharging liquid refrigerant from the evaporator to the receiver.

10. The combination of an ice cream freezer having an evaporator in heat exchanging relation therewith; a low pressure receiver for volatile liquid refrigerant substantially devoid of heat exchanging relation with said freezer; means affording a closed circuit for refrigerant from the receiver upward through said evaporator and back to the receiver; power actuated means for circulating liquid refrigerant through said circuit in the direction stated; and means operable at will for terminating such circulation and discharging the liquid refrigerant from the evaporator to the receiver.

11. The combination of an ice cream freezer having an evaporator in heat exchanging relation therewith; a low pressure receiver for volatile liquid refrigerant substantially devoid of heat exchanging relation with said freezer; means affording a closed circuit for refrigerant from the receiver upward through said evaporator and back to the receiver; and means operable at will for discharging liquid refrigerant from the evaporator to the receiver through a portion of said circuit.

12. The combination of an ice cream freezer having an evaporator in heat exchanging relation therewith; a low pressure receiver for volatile liquid refrigerant substantially devoid of heat exchanging relation with said freezer; means affording a closed circuit for refrigerant from the receiver upward through said evaporator and back to the receiver; power actuated means for circulating liquid refrigerant through said circuit in the direction stated; and means operable at will for terminating such circulation and discharging the liquid refrigerant from the evaporator to the receiver through a portion of said circuit.

13. The combination of an ice cream freezer having an evaporator in heat exchanging relation therewith; a low pressure receiver for volatile liquid refrigerant substantially devoid of heat exchanging relation with said freezer; means affording a closed circuit for refrigerant from the receiver upward through said evaporator and back to the receiver; a suction connection leading from the receiver; a supply line for liquid refrigerant leading to said receiver; means responsive to the quantity of liquid in the receiver for controlling flow through said supply line; and means operable at will for discharging liquid refrigerant from said evaporator to said receiver.

14. The combination of an ice cream freezer having an evaporator in heat exchanging relation therewith; a low pressure receiver for volatile liquid refrigerant substantially devoid of heat exchanging relation with said freezer; means affording a closed circuit for refrigerant from the receiver upward through said evaporator and back to the receiver; power actuated means for circulating liquid refrigerant through said circuit in the direction stated; a suction connection leading from the receiver; a supply line for liquid refrigerant leading to said receiver; means responsive to the quantity of liquid in the receiver for controlling flow through said supply line; and means operable at will for terminating such circulation and discharging the liquid refrigerant from said evaporator to said receiver.

15. The combination of an ice cream freezer having an evaporator in heat exchanging relation therewith; a receiver for volatile liquid refrigerant, substantially devoid of heat exchanging relation with said freezer and located at a lower level than the evaporator; means affording a closed circuit through said receiver and evaporator; a pump for drawing refrigerant from said receiver and delivering it to said evaporator through a portion of said circuit; a drain connection for returning refrigerant from said evaporator to said receiver; and a valve controlling said drain connection and operatively associated with said pump, in such manner that the valve is closed when the pump is running and open when the pump is at rest.

16. The combination of an ice cream freezer having an evaporator in heat exchanging relation therewith; a receiver for volatile refrigerant, substantially devoid of heat exchanging relation with said freezer and located at a lower level than the evaporator; means affording a closed circuit through said receiver and evaporator; means operable to cause circulation of refrigerant in said circuit; a drain connection from said evaporator to said receiver; a normally open valve controlling said connection; and means actuated by flow in said circuit and operatively connected with said valve to close the same when such flow occurs.

17. The combination of an evaporator; a receiver for volatile liquid refrigerant, located at a lower level than the evaporator and substantially out of heat exchanging relation with the space refrigerated by said evaporator; a pump serving to draw liquid refrigerant from said receiver and deliver it to said evaporator; an overflow connection leading from a point above the bottom of said evaporator to said receiver; and means operative when the pump is inactive for draining said evaporator to said receiver.

18. The combination of an evaporator; a receiver for volatile liquid refrigerant, located at a lower level than the evaporator and substantially out of heat exchanging relation with the space refrigerated by said evaporator; a pump serving to draw liquid refrigerant from said receiver and deliver it to said evaporator; an overflow connection leading from the top of said evaporator to said receiver; and means operative when the pump is inactive for draining said evaporator to said receiver.

19. The combination of an ice cream freezer having an evaporator in heat exchanging relation therewith; a low pressure receiver for volatile liquid refrigerant substantially devoid of heat exchanging relation with said freezer; a suction connection in communication with said evaporator; a liquid connection between said evaporator and receiver; and means operable at will to supply liquid refrigerant in quantity from said receiver to said evaporator to sustain active refrigeration in the evaporator, and to suspend said supply and return unevaporated liquid refrigerant to said receiver to arrest such active refrigeration in the evaporator.

20. The combination of an evaporator; a receiver for volatile liquid refrigerant substantially devoid of heat exchanging relation with the space refrigerated by said evaporator, and located at a lower level than the evaporator; a pump serving to draw liquid refrigerant from said receiver and to deliver it to said evaporator; an overflow connection leading from a point above the bottom of said evaporator to said receiver; and valve means serving when open to drain said evaporator to said receiver.

21. The combination of an ice cream freezer having an evaporator in heat exchanging relation therewith; a low pressure receiver for volatile liquid refrigerant substantially devoid of heat exchanging relation with said freezer; a suction connection in communication with said evaporator; a liquid connection between said evaporator and receiver; means for transferring liquid refrigerant from the receiver to the evaporator, to flood the evaporator at least partially and cause active refrigeration therein; and means for suspending such transfer of liquid to the evaporator and for discharging unevaporated liquid from the evaporator to the receiver to free the evaporator of liquid refrigerant and suspend active refrigeration in the evaporator.

In testimony whereof I affix my signature.

ALBERT T. LIGHT.